United States Patent [19]

Zenz

[11] 3,912,466
[45] Oct. 14, 1975

[54] GRANULAR MEDIA FILTERS

[76] Inventor: Frederick A. Zenz, P.O. Box 205, Garrison, N.Y. 10524

[22] Filed: Sept. 25, 1972

[21] Appl. No.: 291,588

[52] U.S. Cl. ........................... 55/96; 55/98; 55/302; 55/512; 55/518
[51] Int. Cl.² .......................................... B01D 46/30
[58] Field of Search ...................... 55/96, 97–99, 55/302, 303, 474, 479, 512, 515–518; 23/284, 288 R, 288 G; 261/94

[56] References Cited
UNITED STATES PATENTS

| | | | |
|---|---|---|---|
| 3,296,775 | 1/1967 | Squires | 55/98 |
| 3,390,512 | 7/1968 | Hanes | 55/96 |
| 3,410,055 | 11/1968 | Zenz | 55/96 |
| 3,594,991 | 7/1971 | Berz et al. | 55/474 |
| 3,798,882 | 3/1974 | Kalen | 55/302 |

FOREIGN PATENTS OR APPLICATIONS

| | | | |
|---|---|---|---|
| 778,537 | 7/1957 | United Kingdom | 55/512 |
| 984,844 | 3/1965 | United Kingdom | 55/512 |
| 455,118 | 2/1970 | Japan | 55/96 |
| 455,119 | 2/1970 | Japan | 55/96 |

OTHER PUBLICATIONS

Tower Packings — U.S. Stoneware, Akron, Ohio, Bulletin TP54, 1957, p. 7.

Zenz et al., The Evolation of Granular Beds for Gas Filtration and Adsorption — In British Chem. Eng. and Proc. Technology, Vol. 17, No. 3, 3/72 p. 224–228.

*Primary Examiner*—Bernard Nozick
*Attorney, Agent, or Firm*—William P. Keegan

[57] ABSTRACT

A granular media filter is cleaned when the media is fluidized by a gas flowing through the filter in the reverse direction during filtering.

1 Claim, 6 Drawing Figures

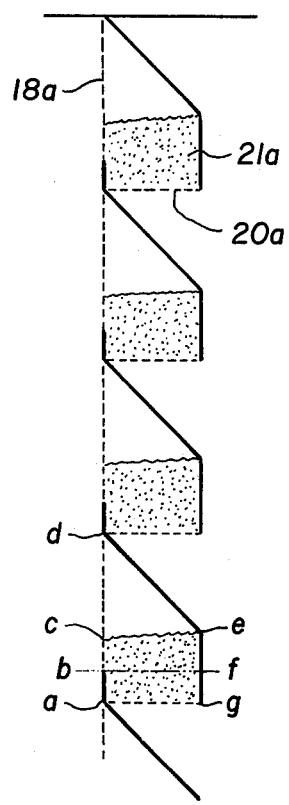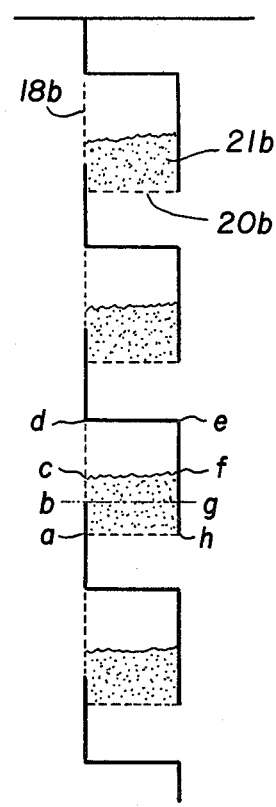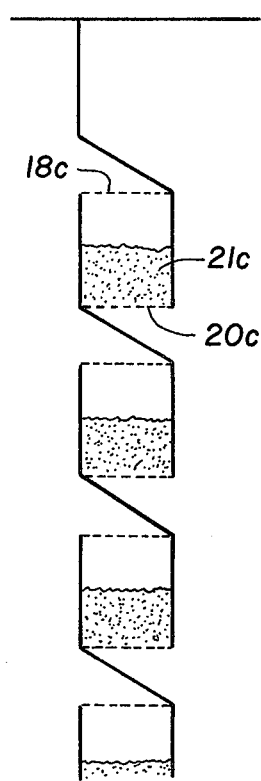
FIG. 2a  FIG. 2b  FIG. 3
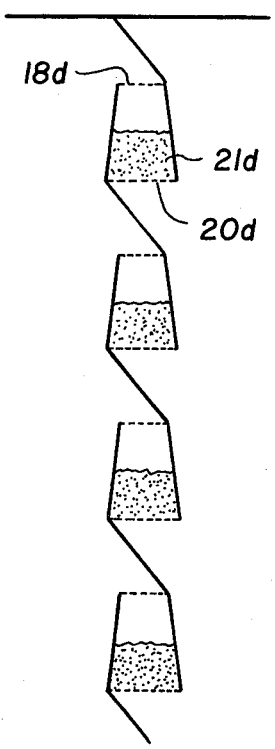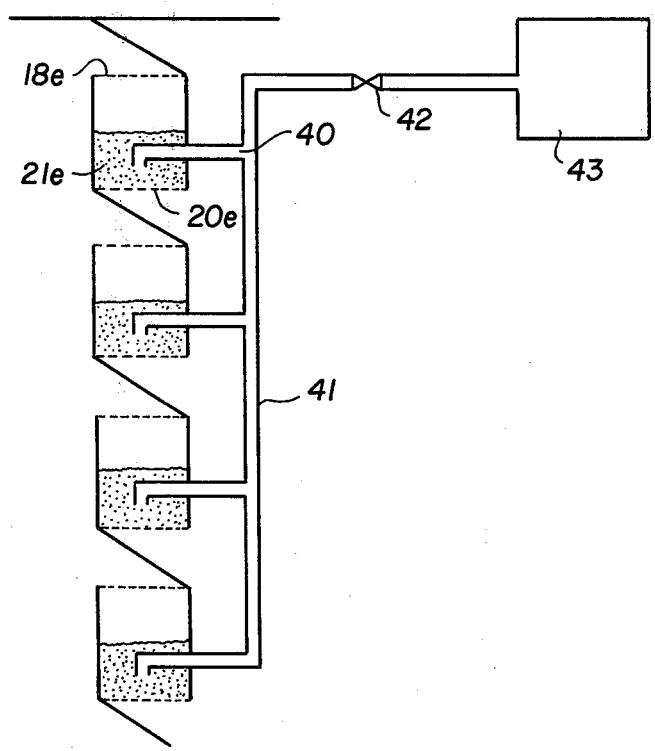
FIG. 4  FIG. 5

GRANULAR MEDIA FILTERS

The invention relates to granular media filters, and more particularly to such filters wherein the granular media is cleaned of filtered particles by passing a clean fluid through the filter in a reverse direction.

In this specification, the filtered fluid will be referred to as a gas, the filtered material as particles, and the granular media as sand, but this is not intended to so limit the principles disclosed nor to preclude the use of other fluids, or filtered material, or granular media.

Granular media filters are well known in the filtering art and many arrangements of such filters have been disclosed. Moreover, several techniques have been utilized to clean the filters as they accumulate particles filtered from the stream of dirty fluid. One such cleaning technique allows the filter media or sand to flow slowly but continuously through the filter panel so that the sand is continuously replenished by fresh sand. Or the sand can be retained in the filter panel until the pressure drop through the panel reaches an unacceptable level at which time the filter panel is exhausted of dirty sand and a fresh supply of clean sand is fed into the filter. In each of these cases, while the technique is effective to clean the filter, the costs of doing so are prohibitive and the mechanical requirements for moving large quantities of sand are demanding. Another technique for cleaning a sand filter is that disclosed in U.S. Pat. No. 3,296,775 wherein the filter panel comprises a slat type arrangement for holding the sand in a vertical panel. When a filter cake builds up on the face of the panel, a reverse flow of gas blows the filter cake and a small quantity of sand off the slats. This sand is then replaced from a supply of clean sand. This arrangement is to be preferred over the ones described above since it involves the circulation of considerably less sand then in the earlier filter arrangements. However, it does involve the circulation of sand and the problems attendant thereon.

My earlier patent, U.S. Pat. No. 3,410,055 is intended to obviate the need to circulate sand by containing the sand in the filter panel between an inlet screen and an outlet screen through neither of which the sand can pass, but which are previous to the dusty gas. When the sand is to be cleaned of the particles filtered from the dusty gas, it is fluidized by a reverse flow of gas through the filter. As the sand is fluidized, the particles that were trapped therein during the filtering operation are blown out of the dirty side of the filter and collected. Since the sand is contained between the inlet screen and the outlet screen the filter is cleaned without the need to circulate sand. When the reverse flow of gas is admitted to the filter it is usually done against the normal steady flow of dusty gas into the filter. This practice is followed to simplify the operation of the filter by obviating the need to shut off the flow of dusty gas during each cleaning operation, particularly since the cleaning operations can occur at relatively frequent intervals. However, when the reverse flow of gas is cut off, particles that should be filtered out of the gas stream may pass through the filter before the sand has settled back to its normal position after the blowback has ceased. Even during the instant this takes to occur, a significant quantity of polluting particles may pass through the filter and thus lower the average efficiency of the unit.

It is the object of this invention to improve the overall operating characteristics of a granular media filter.

This objective is gained by improving the structural configuration of the filter elements, as well as by controlling the flow of the cleaning gas. Also, the physical properties of the granular media are important to the overall operation of the filter.

In carrying out the invention a granular media filter having the granular media contained in compartments between an inlet and an outlet screen is cleaned of accumulated particles filtered from a stream of a dusty gas passing through the filter by a pulse of clean gas flowing through the filter in a reverse direction is characterized in that the compartments containing the granular media are constructed such that the volume of that part of the compartment having the inlet screen as one surface thereof is less than the volume of the granular media contained in the compartment and that the feed of cleaning gas delivered to the filter is first such as would pulse or fluidize the granular media, and then such as would allow the granular media to settle back to its normal position while maintaining a positive pressure on the filter element, after which the flow of cleaning gas is arrested.

A principle feature of the invention is the absence of voids or low pressure passages in the granular media through which dusty gas can pass without being filtered immediately after the granular media has been lifted or fluidized and before the media has settled back to its steady state position.

Features and advantages of the invention can be gained from the foregoing and from the description of a preferred embodiment of the invention which follows.

In the drawing:

FIGS. 2a and 2b are schematic sectional views of alternate arrangements of the filter compartments;

FIG. 3 is a schematic view similar to FIGS. 2a and 2b but showing another suitable arrangement of a filter compartment;

FIG. 4 is a schematic view of still another filter compartment arrangement; and

FIG. 5 is a schematic view of yet another filter compartment arrangement.

Figure 1:
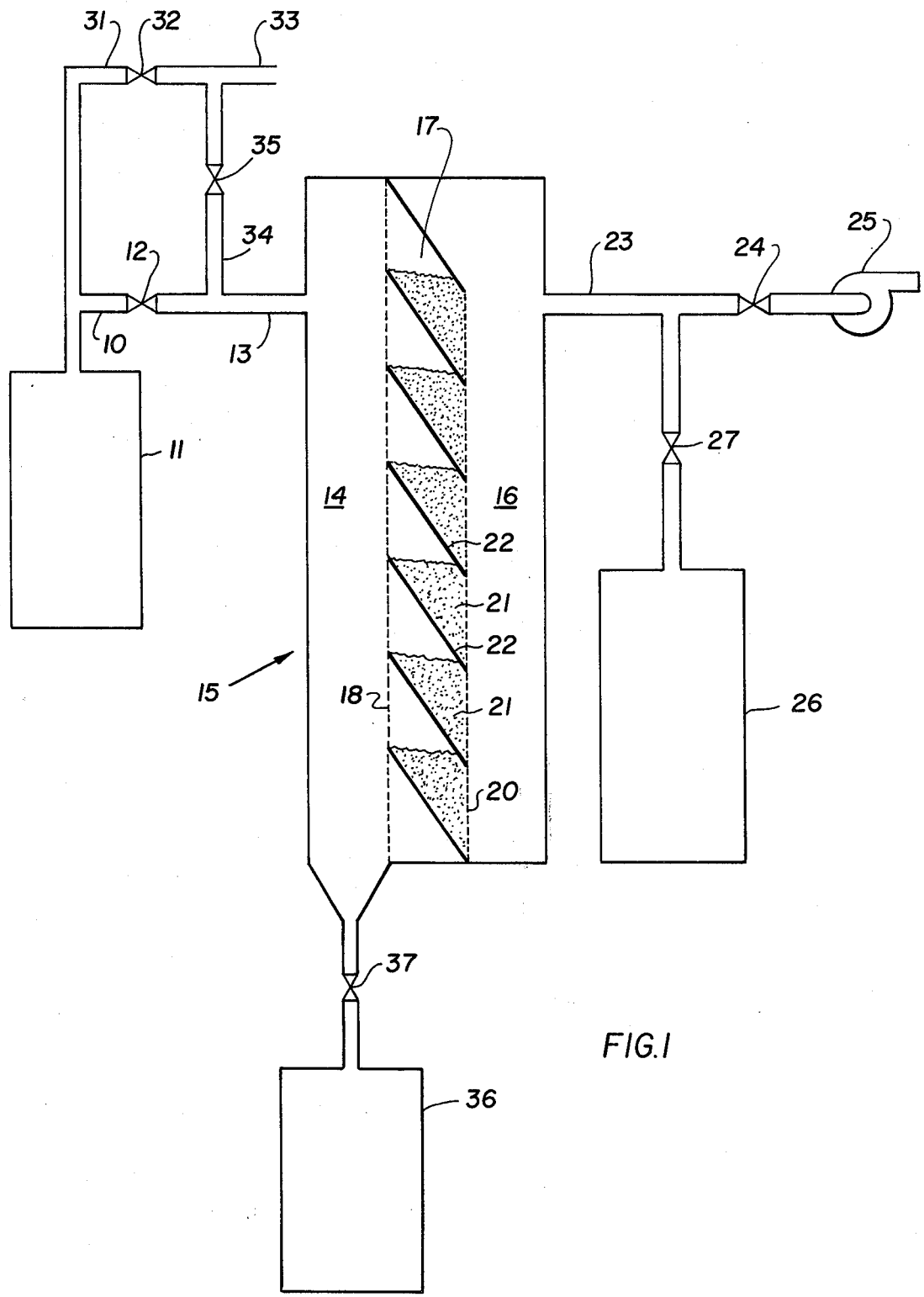
FIG. 1 is a schematic view partly in section of a granular media filter installation.

Referring now to the drawing, and especially to FIG. 1 thereof, a granular media filter installation is schematically illustrated. The particle carrying dusty gas which is to be filtered flows through a conduit 10 leading from the source of the dusty gas 11, to a shut-off valve 12, and conduit 13 to the dusty gas plenum 14 of sand filter 15.

The filter 15 comprises a dusty gas plenum 14 and a clean gas plenum 16 separated by the filter element 17. The filter element, in turn, comprises a porous inlet screen 18 that allows the dusty gas to pass freely through it, and an outlet screen 20, similarly porous, to allow clean gas to pass therethrough. When the word screen is used, it is to be understood to include a perforated plate or any other porous member that will pass the dusty gas. The porosity of screens 18 and 20 is such, however, that the sand beds 21 contained therebetween on slats or louvers 22 will not pass through the screens during either the normal filtering or cleaning operations to be later described. That portion of the filter element containing each sand bed 21 may be considered a filter segment comprising a compartment for containing the sand. A more complete description of a granular media filter of the type herein contemplated will be found in my earlier U.S. Pat. No. 3,410,055. It might be noted that the filter element 17 illustrated may be constructed either as a flat panel or as a hollow cylinder.

Leading from the clean gas plenum 16 there is a conduit 23, a shut-off valve 24, and a blower 25 which aids in the exhaust of the clean gas to the atmosphere. A source of clean gas 26 under pressure for supplying the reverse flow of cleaning gas is connected to conduit 23 through a regulating valve 27.

A second filter (not shown) could be connected in parallel to filter 15 so that as one filter is being cleaned the other could still be functioning in a filtering mode. In such case the source of dusty gas 11 could be connected to the second filter by conduit 31, shut-off valve 32, and conduit 33. A conduit 34 with shut-off valve 35 therein may be provided to connect conduits 13 and 33. The clean gas source 26 and blower 25 may serve both filters with appropriate piping connecting them to the second filter.

In a normal filtering operation, valve 12 is open to admit the flow of dusty gas from source 11, and valve 24 is open to allow the escape of clean gas to the atmosphere. The remaining valves illustrated are closed. When the collected dust has accumulated on the surfaces and in the interstices of the sand in filter element 17 to such an extent that the pressure drop for the flow of gas through element 17 reaches an undesirable level, the element is cleaned by means of a fluidizing reverse flow of clean gas from source 26. This reverse flow of clean gas is usually admitted under one of the following three conditions, although the first is to be preferred because of its simplicity. (1) Valve 27 may be opened and closed instantaneously one or more times without change in any other valve condition, in which case the reverse pulses of clean gas flow against the steady inflow of dusty gas. (2) Valve 27 may be opened and closed instantaneously one or more times after valve 12 has been closed. In this case, the reverse pulses flow through element 17 into closed plenum 14, after which valve 12 is opened and the filter again operates in the filtering mode. (3) Valve 27 may be opened and closed instantaneously one or more times with valve 12 shut and valve 35 open. In this case the reverse pulses flow simply through element 17 into plenum 14 which now has a supplemental relief through valve 35. In all three cases, the reverse flow of clean gas fluidizes the sand and blows the dust particles collected thereby through porous screen 18 into plenum 14. The dust particles then fall by gravity to the bottom of the filter from where they are periodically removed to a collection bin 36 by opening valve 37.

Under all of the foregoing conditions of reverse flow cleaning operations there occurs an instantaneous rise in pressure in the clean side plenum 16 followed by an increase in pressure in the dusty side plenum 14 by which time the pressure in plenum 16 has vented itself through valve 24. At that instant the pressure in plenum 14 is greater than in plenum 16 and there occurs a flow of gas from 14 to 16 through filter element 17. If this flow occurs before the sand 21 returns from its fluidized state to its at rest or steady state condition, there can occur a considerable blow through of dusty gas, plus particles that have not fallen to the bottom of the filter, from plenum 14 to clean gas plenum 16. Moreover, if when the sand is lifted by the reverse flow of gas, the porous screen 18 is left partially uncovered or poorly covered with a back-up bed of granular material the escape of dust particles to the clean gas plenum could be substantial.

To avoid the passage of dust particles through filter element 17 under conditions as just mentioned, it has been found that, after admitting the reverse flow of gas as described in my co-pending application Ser. No. 201,880 filed Nov. 24, 1971 now abandoned, valve 27 should be rapidly closed but only to the point where it still permits a residual reverse flow of gas that is less than the incipient fluidizing velocity of the sand. This flow of cleaning gas is continued as long as it takes for the sand to return to its steady non-fluidized state. Thereafter valve 27 is completely shut-off.

Instead of introducing the cleaning gas under pressure from source 36, the flow of cleaning gas can be induced by means of an ejector or other vacuum-creating device drawing from the dusty side of filter 15, as, for example, by a blower provided in conduit 34. In this case, with valve 24 continuously open to the atmosphere, the pressure in plenum 16 remains essentially constant while that in plenum 14 would be greatly reduced so as to create a flow of gas through filter element 17 from the clean gas plenum. After the vacuum is shut off, during the time the lower pressure in plenum 14 takes to dissipate and return to normal, the sand 21 returns to its rest position. Thus, as the sand settles back to its rest position, there is a positive gas flow from the clean to the dusty side of filter element 17.

In FIGS. 2a and 2b alternate constructions of filter element 17 are shown. The schematic sections illustrated could be from a flat panel filter element or from a ring-type filter element in which each filter section is a ring-like member stacked above a similar member. In both embodiments screens 18a and 18b correspond to screen 18 in FIG. 1; screens 20a and 20b correspond to screen 20; and the sand beds 21a and 21b corresponds to the sand bed 21. It was above stated that if during a cleaning operation when the granular media is lifted or fluidized, any portion of screen 18 is left uncovered, the escape of dust particles could be substantial. This contingency is avoid, in FIG. 2a, when the volume contained in $a\,b\,c\,e\,f\,g$ exceeds the volume contained in $b\,c\,d\,e\,f$, or in other words $a\,b\,f\,g$ must exceed $c\,d\,e$. In the case of the FIG. 2b embodiment, the volume contained in $a\,b\,c\,f\,g\,h$ must exceed that in $b\,c\,d\,e\,f\,g$; or in other words, $a\,b\,g\,h$ must exceed $c\,d\,e\,f$.

In the FIG. 3 embodiment, passage of the dusty gas through the entire bed of granular material is assured, even when the bed is returning from a fluidized to a steady state condition. Here the inlet screen 18c corresponds to the screen 18 in FIG. 1.

FIG. 4 shows the granular media bed compartments with sides tapering inwardly towards the top, although one side could be vertical and the other tapered inwardly. This arrangement is an alternate means of avoiding by pass of the filter bed by dusty gas following a reverse flow cleaning pulse. The individual beds are constricted near their tops. This means that blow back can be regulated such that only the upper surfaces of the beds are fluidized and that therefore there remains a bed of granular material on the bottom or clean side screen 20d at all times. Whenever desired, the reverse flow gas rate can be increased to fluidize the entire bed. This may be desirable in the event the normally non-fluidized portion of the bed accumulates an excess of very fine dust.

The FIG. 5 embodiment is similar to FIG. 3 except that a nozzle 40 is introduced into the interior of each sand bed 21e. Preferably each nozzle is connected to a conduit 41 which is connected through a valve 42 to a source of clean gas. This source of clean gas may be a second source 43 or source 26. This enables one to achieve the same results as the FIG. 4 embodiment since only that part of bed 21e located above nozzle 40 will be fluidized. When it is desired to clean the lower part of bed 21e of accumulated fine dust, cleaning gas from source 26 can be fed to plenum 16 from whence it will pass through screen 20e and fluidize the entire bed.

While the preceeding portion of the specification have dealt with the efficiency of a granular media filter during a cleaning operation, it has also been found that the efficiency of the filter can be increased during the filtering period. This has been brought about by a more advantageous shape of the granular media particles. Specifically granular media particles composed of particles in the shape of cylinders or needles is equally if not more efficient in filtering than a bed of spherical granules of equal diameter and simultaneously offers lower resistance or lower pressure drop to the flow of gases therethrough. The result is a filter of higher capacity. The cylindrical particles should have a length to diameter ratio in the range of one to ten and preferably a range of three to five. In practice the particles need not be perfect cylinders, but could approach, for example, a cigar shape which is a common form in which metallic aluminum granules are available. Cylindrical particles can be fabricated in metal or plastic simply by chopping up wires or filaments of any desired diameter to any desired length.

Having thus described the invention, it is clear that many embodiments apparently differing from the disclosure could be made without departing from the spirit and scope of the invention. It is intended, therefore, that the specification and drawings be interpreted as illustrative rather than in a limiting sense.

What is claimed is:

1. In a granular bed filter having entrance and exit sides in which a bed of granular material is supported in a filter compartment by screen means and in which a stream of dusty gas first passes through said granular material where suspended particles are removed from said gas stream and filtered gas exits through the screen means, the method of operating and cleaning said filter of particles removed from the dusty gas which method comprises the steps of introducing the dusty gas to the entrance of the filter in a continuous non-interrupted stream, periodically cleaning said granular material of accumulated particles filtered from the dusty gas by feeding a pulse of clean gas through said filter compartment in a reverse direction sufficient to fluidize the granular material in said filter compartment, reducing the flow of clean gas to a level below the incipient fluidization rate to allow the granular material to settle from its fluidized state into a bed at rest but sufficient to maintain a pressure on the exit side of said filter compartment higher than the pressure maintained on the entrance side of said filter compartment by the dusty gas stream whereby the flow of dusty gas into the filter compartment is prevented prior to settlement of the granular material into a bed supported on the screen means, and, after the granular material has settled into a bed at rest, arresting the flow of clean gas to allow the dusty gas to flow into the filter compartment and be filtered of entrained dust particles.

* * * * *